Patented Feb. 17, 1953

2,628,923

UNITED STATES PATENT OFFICE 2,628,923

ARTICLE COMPRISING COATED POLYSTYRENE

Luther L. Yaeger, Hammond, Ind., assignor to Nash-Kelvinator Corporation, Kenosha, Wis., a corporation of Maryland No Drawing. Application April 26, 1948, Serial No. 23,392

8 Claims. (Cl. 117—138.8)

This invention relates to chemical compositions comprising a cellulose mixed ester, and it includes coating compositions for improving the surface properties of plastics.

An object of the invention is to so improve the surface properties of polystyrene type plastics as to far enhance said plastics and to greatly increase their utility.

Heretofore it has been difficult to consistently obtain a good adhesion between polystyrene and such resistant coatings as are applied thereto, as pointed out in the co-pending patent application, Serial No. 730,192 filed February 21, 1947, now Patent 2,578,665, of which the present application is a continuation in part. In said patent application, disclosure was made of compositions in which a cellulose acetyl butyrate resin was employed together with an acrylate type resin. While reference is now being made specifically to cellulose acetyl butyrate resin, this is done by way of illustration only, and not in any sense of limitation, it being fully understood that other mixed cellulose esters may also be employed for the purpose of this invention, as will be further specified below.

An object of this invention is to provide new and improved protective surface coatings, which will show a consistently good adhesion to polystyrene type plastics.

Another object is to provide new and improved coating compositions for polystyrene type plastics.

Another object is a new and useful class of chemical compositions.

Another object is an article comprising a polystyrene type plastic, which has received increased and enhanced surface resistance to solvents, and/or abrasion, and/or dust attraction.

Further objects will become apparent as the following detailed description proceeds.

In accordance with my invention I employ for the purposes herein set forth, as the solid cellulosic constituent of the coating composition, a mixed cellulose ester which has a hydroxyl content lower than about 1.8% and, preferably, lower than .9%.

The following experiments illustrate the influence of the hydroxyl group on the bonding properties of such coatings. The parts listed are by weight.

Example 1

| | Parts |
|---|---|
| Ethylene glycol monomethyl ether | 50 |
| Diacetone alcohol | 30 |
| Ethylene glycol monoethyl ether acetate | 15 |

91% of the above composition was intermixed with 9% of the different cellulose acetyl butyrates tabulated below. The compositions thus obtained were agitated at room temperature until completely homogeneous, and then applied to polystyrene panels by dipping, and dried under infrared bulbs at a surface temperature of 130° C. with good air circulation. In 10 minutes it had obtained a degree of hardness closely approximating final hardness. Adhesion of the polystyrene panels thus treated was tested by pressing an adhesive tape to said panels and withdrawing it rapidly, with a jerk. In the case where the surface coating adhered, forming an integral bond, which could not be broken by this adhesive tape test, nor scratched away with a pointed metallic instrument, it was considered that good bond existed.

The results are tabulated below:

| Cellulose Ester Composition— | | | Viscosity of Cellulose Ester (ASTM Method) D-871-46T) | Bond to Styrene Composition |
|---|---|---|---|---|
| Percent Acetyl | Percent Butyryl | Percent Hydroxyl | | |
| 5-7 | 47-50 | .6 | 10 | Excellent |
| 13.5 | 36.5 | 2.0 | 25 | None |
| 20.5 | 26.5 | 2.7 | 4 | Do. |
| 31 | 17 | .4 | 3 | Excellent |
| 31 | 17 | .4 | 15 | Do. |
| 31 | 17 | .4 | 50 | Do. |
| 35.7 | 8 | 2.0 | 187 | None |
| 35.5 | 8 | .6 | 30 | Excellent |
| 6 | 48.3 | .8 | 15 | Do. |
| 24 | 25 | 1.2 | 9 | Not quite perfect |
| 28.5 | 19 | .9 | 10 | Excellent |
| 15.5 | 35 | 1.8 | 15 | Fair |
| Propionyl | | | | |
| 24 | 20 | .9 | 12 | Excellent |
| 29 | 15 | 1.85 | 30 | Fair |
| 3 | 45 | 2.5 | 5 | None |
| 6-8 | 48.4 | .1 | 13 | Excellent |

Other polystyrene panels were lined up against a solid background and were then sprayed with the composition of this example, so that a uniform, even coating of the composition was poured on the panels. These panels were then dried in air under infra-red lamps, giving a temperature at the drying surface of 125° F. After that time the adhesion tests were made in the manner as stated above, and the results were as shown in the last column of the above table.

Example 2

A composition was made of the following ingredients:

| | Parts |
|---|---|
| Ethylene glycol monomethyl ether | 50 |
| Diacetone alcohol | 30 |
| Nitromethane | 10 |
| Ethylene glycol monoethyl ether acetate | 10 |

91% of the above composition was intermixed with 9% of the cellulose derivatives of Example 1. The polystyrene panels were dipped in the compositions thus obtained, then allowed to dry at room temperature, at a relative humidity of 45%. In this case also, uniformly excellent adhesion, by any of the tests mentioned above was obtained when the hydroxyl content of the samples was less than .9, fair to good between .9 and 1.8, fair to poor with some sporadic passable results between 1.8 and 2.5, and poor above 2.5.

While in the above examples reference has been made to certain specific embodiments of the invention, it will be obvious to those skilled in the art that substantial modifications therefrom can be made without departing from the spirit or scope of the invention. For instance, while reference has been made above, by way of example and not of limitation, to polystyrene, it is fully understood that the same will apply also to such other plastic combinations as have substantially the surface characteristics of polystyrene. These include co-polymers of polystyrene with other ingredients, such as acrylonitrile, methacrylates, etc., where the polystyrene is the type of ingredient preponderantly determining surface characteristics displayed, even though not necessarily the ingredient present in the major proportion. Furthermore, I may apply in the present invention dichloro polystyrene, isopropyl polystyrene, and other analogous compositions.

The mode of application of the coating compositions to the surface to be coated is irrelevant to the invention, since any means by which the liquid composition is applied uniformly to the surface to be treated can obviously be used for the purposes of the invention.

Resinous polymers of acrylic and methacrylic acids, their esters, and co-polymers thereof may be included in the compositions, as disclosed in the co-pending application, Serial No. 730,192, filed February 21, 1947, now Patent 2,578,665. A preferred composition contains from one to 49% of said polymers. These resinous polymers are particularly useful in improving the bond of the cellulose mixed ester in the higher hydroxy percentages.

With reference to the mode of drying, I find it preferable to dry at a temperature higher than room temperature, both to speed operations and to avoid "blushing," and obviously at a temperature lower than the distortion point of the particular plastic used as the base material. Instead of cellulose acetyl butyrates, I may employ, also, other cellulose esters such as cellulose formyl butyrate, cellulose acetyl propionate, cellulose formyl acetate, cellulose propyl hexionate, cellulose hexyl propionate, and cellulose butyl propionate. The ranges stated above apply also to these mixed esters; with hydroxyl content less than about .9% a perfect bond is obtainable; with hydroxyl content .9% to 1.8% the bond was sometimes very good, but sometimes spotty, and in the latter range some uncertainty in results would prevail. At hydroxyl contents above 2%, which is a common range for commercial mixed cellulose esters, no bond was obtained.

Obviously, the presence or absence of additional or other ingredients either in the base material or in the coating compositions or coatings is not of the essense of the invention, and the invention will not be avoided or circumvented by the inclusion of such materials which do not interfere with the main function disclosed and still perform some useful function. Such permissible additional material includes, for example, ultraviolet screening agents, plasticizers, pigments, dyestuffs, odorants and deodorants, bleaching agents, and the like. The term, "acrylate resin," as used in the specification means the resinous polymers of acrylic acid, acrylic acid esters such as methyl, ethyl and butyl acrylates, and esters of methacrylic acid such as methyl, ethyl and butyl methacrylates.

The cellulose acetyl butyrate and other materials to be deposited as coating are dissolved in solvent compositions, and said compositions should be substantially non-solvent for polystyrene and solvent for the materials to be deposited as coating.

In addition to the preferred solvent formulations shown in the examples, suggested ranges of percentage for these groups of solvents are as follows:

Aliphatic ketones and esters, toluene, and nitro-aliphatic substances other than nitromethane having a boiling range below 120° C.

|  | Per cent |
|---|---|
| Preferred | 3 to 25 |
| Usable | 1 to 35 |

Nitro-methane, aliphatic alcohols and lactates having less than 6 carbon atoms

|  | Per cent |
|---|---|
| Preferred | 5 to 35 |
| Usable | 2 to 45 |

Diacetone alcohol, lactates having from 5 to 10 carbon atoms, glycol ethers and esters.

|  | Per cent |
|---|---|
| Preferred | 20 to 100 |
| Usable | 14 to 100 |

The percentages are given merely as guides. Because of the great flexibility of this type of solvent formulation, it is not possible to state absolute ranges. When modifying solvent compositions, the balance between polystyrene solvents and polystyrene non-solvents must be maintained. This is done in the following manner:

If the coating composition is turbid, the percentage of ketone type solvent or of glycol ether ester should be increased, and likewise if the bond of the coating to the polystyrene is poor. If, on the other hand, the polystyrene surface is etched by the coating composition, then the percentage of those solvents just mentioned should be reduced in favor of nitromethane, lower aliphatic alcohols, lactates and ethylene glycol monomethyl ester, or hydrocarbon non-solvents such as aliphatic petroleum fractions, e. g., kerosene, or of combinations of these, or other solvents having similar solvent and volatility characteristics.

While specific reference has been made to certain solvent combination, it is understood that any of the suitable coating combinations known to the art, as disclosed in the co-pending parent application, Serial No. 730,192, now Patent 2,578,665, or in the co-pending applications Nos. 730,193, now Patent 2,578,683, and 730,207, now Patent 2,578,770, will serve the purposes of this invention.

It is apparent from the foregoing that the invention is of broad scope, and is not to be limited to the specific embodiments disclosed, or in any fashion excepting by the claims, in which it is my intention to cover all novelty inherent in this invention as broadly as possible, in view of prior art.

Having thus disclosed my invention, I claim:

1. An article of manufacture comprising a polystyrene surface and a coating integrally bonded thereto, said coating comprising a cellulose mixed ester derived from aliphatic acids having 1–5 carbon atoms, said cellulose mixed ester having hydroxyl content lower than 1.8%.

2. An article of manufacture comprising a polystyrene surface and a coating integrally bonded thereto, said coating comprising a cellulose mixed ester derived from aliphatic acids having 1–5 carbon atoms, said cellulose mixed ester having hydroxyl content lower than .9%.

3. An article of manufacture comprising a polystyrene surface and a coating integrally bonded thereto, said coating comprising a cellulose mixed ester derived from aliphatic acids having 1–5 carbon atoms, said cellulose mixed ester having hydroxyl content lower than 1.8% and a substance selected from the group consisting of the film-forming resinous polymers of methacrylic acid, acrylic acid, and esters thereof.

4. An article of manufacture comprising a polystyrene surface and a coating integrally bonded thereto, said coating comprising a cellulose mixed ester derived from aliphatic acids having 1–5 carbon atoms, said cellulose mixed ester having hydroxyl content lower than .9% and a substance selected from the group consisting of the film-forming resinous polymers of methacrylic acid, acrylic acid, and esters thereof.

5. An article of manufacture comprising a polystyrene surface, and a coating integrally bonded thereto, said coating comprising cellulose acetyl butyrate having hydroxyl content lower than 1.8%, and from 1 to 49% of a substance selected from the group consisting of the film-forming resinous polymers of methacrylic acid, acrylic acid, and esters thereof.

6. An article of manufacture comprising a polystyrene surface, and a coating integrally bonded thereto, said coating comprising cellulose acetyl butyrate having hydroxyl content lower than .9% and from 1 to 49% of a substance selected from the group consisting of the film-forming resinous polymers of methacrylic acid, acrylic acid, and esters thereof.

7. An article of manufacture comprising a polystyrene surface, and a coating integrally bonded thereto, said coating comprising cellulose acetyl butyrate having hydroxyl content lower than 1.8%.

8. An article of manufacture comprising a polystyrene surface, and a coating integrally bonded thereto, said coating comprising cellulose acetyl butyrate having hydroxyl content lower than .9%.

LUTHER L. YAEGER.

REFERENCES CITED

The following references are of record in the file of this patent:

UNITED STATES PATENTS

| Number | Name | Date |
| --- | --- | --- |
| 2,071,419 | Moss | Feb. 23, 1937 |
| 2,139,008 | Ensminger | Dec. 6, 1938 |
| 2,238,694 | Graves | Apr. 15, 1941 |
| 2,292,393 | Mitchell | Aug. 11, 1942 |
| 2,404,426 | Bechtold et al. | July 23, 1946 |